(12) United States Patent
Simonsson et al.

(10) Patent No.: US 10,194,322 B2
(45) Date of Patent: Jan. 29, 2019

(54) COORDINATED TRANSMISSION METHOD FOR UNBALANCED LOAD

(71) Applicant: TELEFONAKTIEBOLAGET LM ERICSSON (PUBL), Stockholm (SE)

(72) Inventors: Arne Simonsson, Gammelstad (SE); Francisco Rodrigo Porto Cavalcanti, Fortaleza—Ceará (BR); Yuri C. B. Silva, Fortaleza (BR); Elvis M. G. Stancanelli, Quixada (BR)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 72 days.

(21) Appl. No.: 15/318,728

(22) PCT Filed: Jun. 23, 2014

(86) PCT No.: PCT/SE2014/050772
§ 371 (c)(1),
(2) Date: Dec. 14, 2016

(87) PCT Pub. No.: WO2015/199585
PCT Pub. Date: Dec. 30, 2015

(65) Prior Publication Data
US 2017/0156064 A1 Jun. 1, 2017

(51) Int. Cl.
*H04W 16/04* (2009.01)
*H04B 7/24* (2006.01)
(Continued)

(52) U.S. Cl.
CPC ............ *H04W 16/04* (2013.01); *H04B 7/024* (2013.01); *H04L 5/0035* (2013.01);
(Continued)

(58) Field of Classification Search
USPC ........................................................ 455/453
See application file for complete search history.

(56) References Cited

U.S. PATENT DOCUMENTS 6,321,083 B1 * 11/2001 Vaara .................... H04W 24/00
 455/432.1
6,714,789 B1 3/2004 Oh et al.
(Continued)

OTHER PUBLICATIONS

Supplementary European Search Report—EP 14895525.5—dated Jan. 31, 2018—pp. 11.
(Continued)

*Primary Examiner* — Maharishi V Khirodhar
*Assistant Examiner* — Kenneth P Hunt
(74) *Attorney, Agent, or Firm* — Sage Patent Group

(57) ABSTRACT

A method in a network node for handling a transmission between a plurality of Transmission Points, TPs, and User Equipments, UEs, in a wireless network. The network node receives information from each respective UE out of a number of first UEs served by the network node, which information is related to the location of the UE. The network node then identifies a hot spot, based on the information received from the UEs. The hot spot is an area where the load density of UEs is above a first threshold. When a hot spot is defined the network node selects a plurality of TPs dedicated to serve the UEs 130 located in the hot spot and establishes a coordinated transmission mode from the plurality of dedicated TPs to the UEs located in the hot spot.

14 Claims, 6 Drawing Sheets

(51) Int. Cl.
*H04L 12/26* (2006.01)
*H04L 5/00* (2006.01)
*H04W 4/02* (2018.01)
*H04W 48/20* (2009.01)
*H04B 7/024* (2017.01)
*H04W 36/22* (2009.01)

(52) U.S. Cl.
CPC ........ *H04L 5/0069* (2013.01); *H04L 43/0888* (2013.01); *H04W 4/02* (2013.01); *H04W 36/22* (2013.01); *H04W 48/20* (2013.01)

(56) References Cited

U.S. PATENT DOCUMENTS

| | | | | |
|---|---|---|---|---|
| 8,737,222 | B2* | 5/2014 | Sridhar | H04W 36/04 370/235 |
| 9,301,130 | B2* | 3/2016 | Clevorn | H04W 8/245 |
| 2007/0147310 | A1* | 6/2007 | Cai | H04W 74/008 370/335 |
| 2011/0053597 | A1* | 3/2011 | Lee | H04W 36/22 455/436 |
| 2012/0264470 | A1 | 10/2012 | Bajj et al. | |
| 2012/0307639 | A1* | 12/2012 | Zirwas | H04W 28/08 370/236 |
| 2012/0315948 | A1* | 12/2012 | Frenger | H04W 52/0232 455/522 |
| 2013/0040683 | A1 | 2/2013 | Siomina et al. | |
| 2013/0166644 | A1* | 6/2013 | Sun | H04L 5/0094 709/204 |
| 2013/0272132 | A1 | 10/2013 | Heo et al. | |
| 2014/0148149 | A1* | 5/2014 | Kwan | H04W 24/08 455/422.1 |
| 2014/0355507 | A1* | 12/2014 | Amerga | H04W 4/08 370/312 |
| 2015/0349854 | A1* | 12/2015 | Zhao | H04B 7/024 370/252 |
| 2016/0105834 | A1* | 4/2016 | Gupta | H04W 36/0083 370/332 |
| 2017/0272219 | A1* | 9/2017 | Park | H04L 5/0035 |

OTHER PUBLICATIONS

3GPP, "3rd Generation Partnership Project; Technical Specification Group Services and System Aspects; General Packet Radio Service (GPRS) enhancements for Evolved Universal Terrestrial Radio Access Network (E-UTRAN) access (Release 12)," 3GPP TS 23.401 V12.1.0, Jun. 2013.

Liu et al., "Hybrid Cooperative Transmission in Heterogeneous Networks," 2012 IEEE 23rd International Symposium on Personal, Indoor and Mobile Communications—(PIMRC), Sep. 9-12, 2012, Sydney, AU.

Yoo et al., "On the Optimality of Mulliantenna Broadcast Scheduling Using Zero-Forcing Beamforming," IEEE Journal on Selected Areas in Communications, Mar. 2006, vol. 24, No. 3.

International Search Report and Written Opinion dated Feb. 25, 2015 in related International Application No. PCT/SE2014/050772.

* cited by examiner

COORDINATED TRANSMISSION METHOD FOR UNBALANCED LOAD

TECHNICAL FIELD

Embodiments herein relate to a network node and methods therein. In particular, it relates to a method in a network node for handling a transmission between a plurality of Transmission Points (TPs) and User Equipments (UEs) in a wireless network.

BACKGROUND

Communication devices such as UEs are enabled to communicate wirelessly in a cellular communications network or wireless communication system, sometimes also referred to as a cellular radio system or cellular networks. The communication may be performed e.g. between two UEs, between a UE and a regular telephone and/or between a UE and a server via a Radio Access Network (RAN) and possibly one or more core networks, comprised within the cellular communications network.

UEs may further be referred to as wireless terminals, wireless devices, mobile terminals, mobile stations, mobile telephones, cellular telephones, laptops, tablet computers or surf plates with wireless capability, just to mention some further examples. The UEs in the present context may be, for example, portable, pocket-storable, hand-held, computer-comprised, or vehicle-mounted mobile devices, enabled to communicate voice and/or data, via the RAN, with another entity, such as another user equipment or a server. The UE may also be a machine to machine communication device that serves as a data communication modem or is built in to equipment communicating data with server without human interaction.

The cellular communications network covers a geographical area which is divided into cell areas, wherein each cell area is served by an access node. A cell is the geographical area where radio coverage is provided by the access node.

The access node may further control several transmission points (TPs), e.g. having Remote Radio Units (RRUs). A cell may thus comprise one or more access nodes each controlling one or more transmission/reception points. The TP, also referred to as a transmission/reception point, is an entity that transmits and/or receives radio signals. The entity has a position in space, e.g. an antenna. An access node, also referred to as a network node, is an entity that controls one or more transmission points. The access node may e.g. be a base station such as a Radio Base Station (RBS), enhanced Node B (eNB), eNodeB, NodeB, B node, or BTS (Base Transceiver Station), depending on the technology and terminology used. The base stations may be of different classes such as e.g. macro eNodeB, micro eNodeB, home eNodeB or pico base station, based on transmission power and thereby also cell size.

Further, each access node may support one or several communication technologies. The access nodes communicate over the air interface operating on radio frequencies with the UEs within range of the access node. In the context of this disclosure, the expression Downlink (DL) is used for the transmission path from the base station to the mobile station. The expression Uplink (UL) is used for the transmission path in the opposite direction i.e. from the UE to the base station.

In 3rd Generation Partnership Project (3GPP) Long Term Evolution (LTE), base stations, which may be referred to as eNodeBs or even eNBs, may be directly connected to one or more core networks.

Since UEs mostly are non-stationary, non-uniformities of the system load in a wireless network may appear. Slight non-uniformities of the system load may not significantly affect the quality of provided services, however the UE's experience is likely to be impaired in more extreme cases. Among those extreme cases, a very important one is the appearance of hot spots. Herein hot spot means a small geographic portion of the coverage area heavily populated by UEs or heavily loaded by UEs with high data load, and its appearance may be due to a myriad of events usually unrelated to the communication network. If the coverage area of a TP is too heavily populated by UEs, there may not be any resources available for transmission for some of the UEs at that given transmission point.

The most advisable solution to deal with hot spots is to predict where they may appear as well as their demographic density and extent; thereafter, the prediction is availed to feed the network planning phase. A first challenge faced by this classical solution concerns designing the prediction algorithm, since any prediction attempt is usually subjected to a certain uncertainty. For the sake of simplicity, a posteriori information of the system load may be used in place of the prediction. However, this solution should be employed in a sparingly way, since it may easily lead to an over-dimensioning of the network and a clear increase in costs, since it tends to require further TPs.

SUMMARY

It is therefore an object of embodiments herein to provide an improved procedure for handling a transmission between a plurality of Transmission Points and User Equipments in areas with high density of UEs, also known as hot spots.

Establishing which UEs are grouped has an important role in the success of coordination. The grouping strategy must be capable of distinguishing between sub-areas under different demographic densities of UEs, since the load may be non-uniformly distributed throughout the cell area, referred hereafter to as unbalanced load. Understanding how the UEs may be more or less concentrated in small geographic areas is the key to devise an improved grouping strategy that takes advantage of the unbalanced load, or at least is less affected by it. It is known beforehand that the unbalance on the load directly affects the multiuser diversity and, therefore, it will probably hamper the efficiency of conventional transmission strategies.

According to a first aspect of embodiments herein, the object is achieved by a method in a network node for handling a transmission between a plurality of Transmission Points, TPs, and User Equipments, UEs, in a wireless network. The network node receives information from each respective UE out of a number of first UEs served by the network node. This information is related to the location of the UE. When the network node has received the information it identifies any occurrence of a hot spot, based on the received information. In this case the hot spot is an area where the load density of UEs is above a first threshold. After having identified the hot spot, the network node selects a plurality of TPs which are dedicated to serve UEs located in the hot spot. These UEs are a subset of the plurality of first UEs. The network node further establishes a coordinated transmission mode from the plurality of dedicated TPs to the UEs located in the hot spot.

According to a second aspect of embodiments herein, the object is achieved by a network node for handling a transmission between a plurality of Transmission Points, TPs, and User Equipments, UEs, in a wireless network. The network node is configured to receive information from each respective UE out of a number of first UEs served by the network node, which information is related to the location of the UE. The network node is further configured to identify a hot spot, based on the information received from the UEs. The hot spot is an area where the load density of UEs is above a first threshold. The network node is also configured to select a plurality of TPs dedicated to serve the UEs located in the hot spot, which UEs are a subset of the plurality of first UEs. Furthermore the network node is configured to establish a coordinated transmission mode from the plurality of dedicated TPs to the UEs located in the hot spot.

By dynamically identifying hot spots and establishing a coordinated transmission mode from the plurality of dedicated TPs to the UEs located in the hot spot, the transmission scheme may dynamically adapt to temporal variations of the channels and loads, which allows finding a trade-off between performance and complexity for UEs inside and outside the hot spots.

BRIEF DESCRIPTION OF THE DRAWINGS

Examples of embodiments herein are described in more detail with reference to attached drawings in which.

DETAILED DESCRIPTION

Embodiments herein disclose a method for handling a transmission between a plurality of TPs and UEs in areas with high density of UEs, and a network node for performing the method.

Embodiments herein provides a method for dynamically identifying hot spots, as well as a hybrid transmission strategy for dealing with UEs inside the hot spots. In a further embodiment a transmission strategy for also handling UEs outside of the hot spots is provided. In one embodiment herein UEs inside and outside of a hot spot are grouped, and, thereafter, each group is served in a proper transmission scheme. Based on information e.g. about system load, the available TPs are set to efficiently serve UEs located in each hot spot, providing a trade-off between performance and complexity of the network. In this way, the hybrid scheme allows handling the hot spots in an instantaneous way, even if its appearance has not been addressed during a network planning phase. A joint processing and a coordinated scheduling are known as conventional transmission schemes for Coordinated Multi-Point (CoMP) technology.

The CoMP technology allows a dynamic coordination of transmission and reception for multiple geographically separated TPs. By dynamically coordinating the TPs in a wireless network, a TP currently serving a cell with a low load can be redirected to serve a cell or an area with a high load, such as a hot spot. CoMP thereby enables a more efficient utilisation of the available TPs in the network.

Since the coordinated transmission mode according to embodiments herein is established for the UEs located in the hot spot, the overall overhead such as UE's feedback and backhaul traffic may be reduced with regard to a fully coordinated CoMP-cell that employs for example central joint processing for all UEs in the network, which may require an excessive amount of Channel State Information, CSI, to coordinate large areas.

Furthermore the system spectral efficiency may be boosted with regard to an uncoordinated system or a system which does not apply a tighter coordination for the hot spots, which results in lower system costs than inserting further TPs derived from re-planning of the cells.

It is also possible to create a long-term report comprising the employed hybrid configurations, which could provide useful information for a re-planning of the cells.

Figure 1:
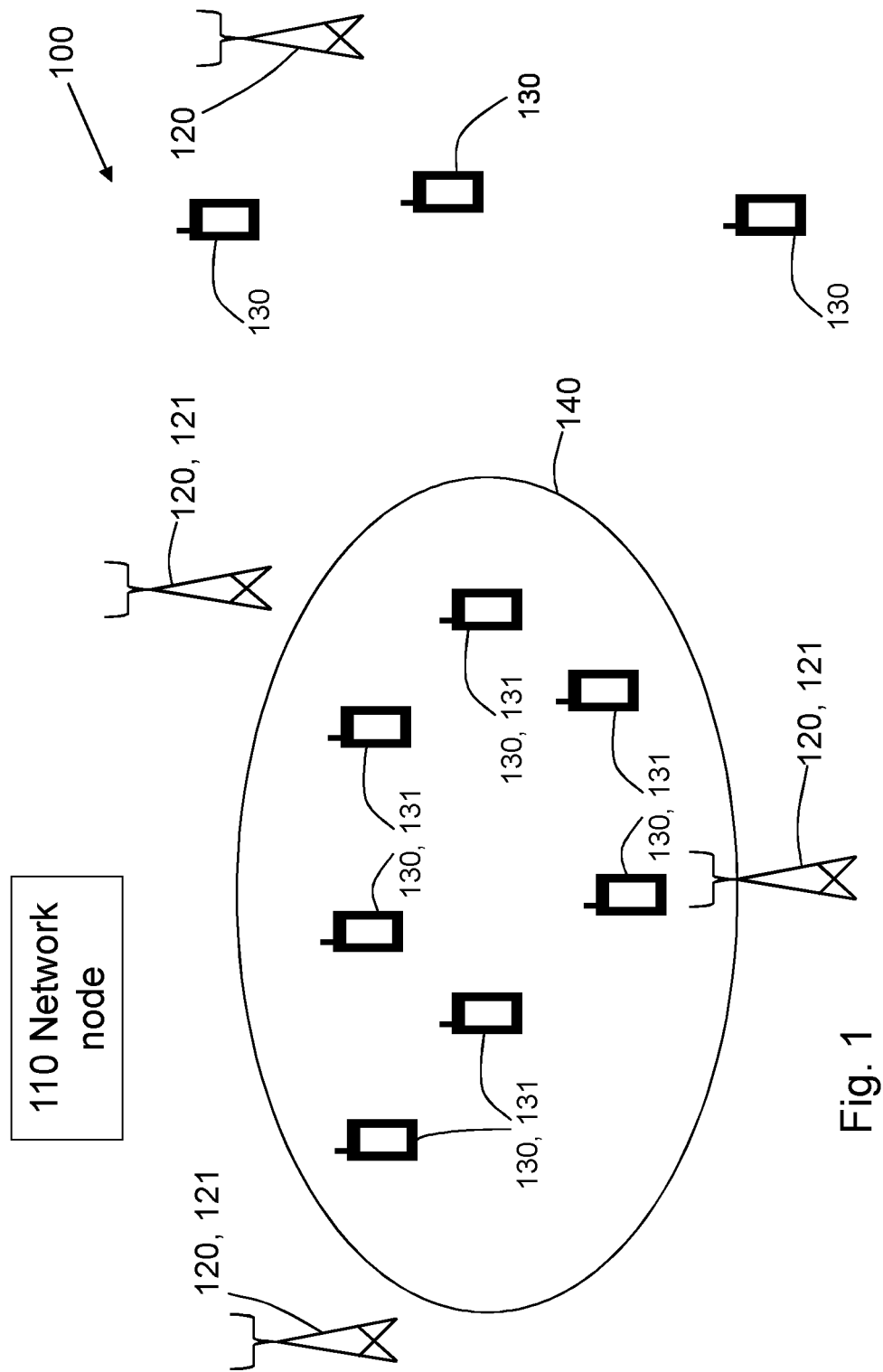
FIG. 1 is a block diagram illustrating embodiments of a network in an LTE architecture.

FIG. 1 depicts an example of a wireless communications network 100. The wireless communications network 100 may be a wireless or a cellular network e.g. based on any of 3rd Generation, Universal Mobile Telecommunications System (UMTS), Wideband Code Division Multiple Access (WCDMA), High Speed Packet Access (HSPA) and 4th Generation (4G), Evolved Packet System (EPS), LTE, LTE Advanced (LTE-A). It may also be a Global System for Mobile Communications (GSM) network, any 3GPP cellular network, Worldwide Interoperability for Microwave Access (WiMAX), or any cellular network or system.

The wireless communications network 100 comprises a network node 110 which may be a radio base station, for example an eNB, an eNodeB, or an Home Node B, an Home eNode B or any other network node capable to serve a UE 130, 131 or a machine type communication device in a wireless communications network. The network node 110 comprises a plurality of transmission points (TPs) 120, 121 for serving the UEs 130, 131 located in a land area covered by the TPs 120, 121. The land area served by one of the TPs 120, 121 is also known as a cell. Although only one network node 110 is depicted in FIG. 1, a plurality of network nodes 110 may be configured to operate in the same wireless communications network 100.

A plurality of UEs 130 are configured to operate in the wireless communications network 100. The network node 110 may be a transmission point for the UEs 130. However, embodiments herein may be applied in any kind of network scenario where the UEs 130 and the network node 110 communicate over a radio link, such as e.g. in LTE.

The UEs 130, may e.g. be wireless devices, mobile wireless terminals, wireless terminals, mobile phones, computers such as e.g. laptop, Personal Digital Assistants (PDAs) or tablet computers, sometimes referred to as a surf plates with wireless capability, or any other radio network units capable to communicate over a radio link in a wireless communications network 100. Please note the term UE used in this document also covers other wireless devices such as Machine to machine (M2M) devices.

FIG. 1 further depicts a scenario where several UEs 130 are located in a small geographic portion of the coverage area of the TPs 120, 121, thereby creating an area with a higher load on the neighbouring TPs 120, 121 than in the rest of the wireless communications network 100. The UEs 130 comprised in this area with a higher load are referred to as UEs 130, 131. Such a highly populated portion of the coverage area is referred to as a hot spot 140. If the coverage area of a TP 120, 121 is too heavily populated by UEs 130, 131, there may not be any resources available for transmission for some of the UEs 130, 131 at that given TP 120, 121.

Figure 2:
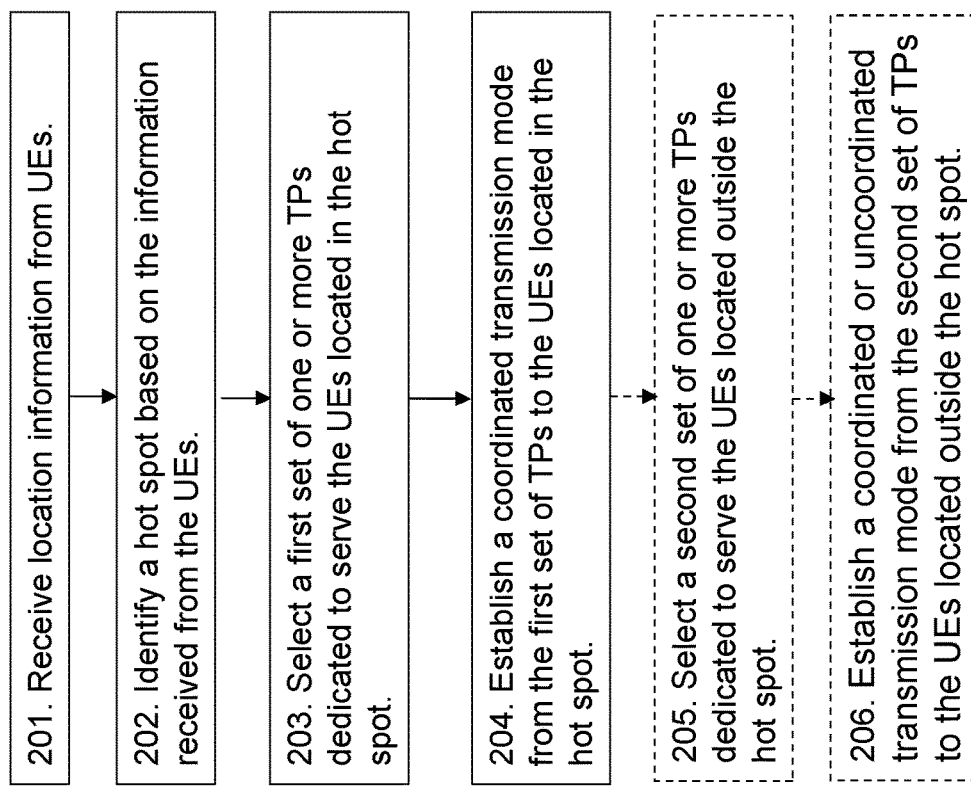
FIG. 2 is a flowchart depicting embodiments of a method in a network node.

Thus, example of embodiments of a method in the network node 110 for handling a transmission between a plurality of TPs 120, 121 and UEs 130, 131 in areas with high density of UEs 130, 131 will now be described with reference to a flowchart depicted in FIG. 2.

The method in the network node 110 comprises the following actions, which actions may be taken in any suitable order. Some of the boxes are marked with dashed lines, indicating that this action is not mandatory.

Action 201

The network node 110 receives information from each respective UE 130 out of a number of first UEs 130 served by the network node 110. This information is related to the location of the UE 130, and may be any of a cell identity, a direction of arrival, signal strength, WIFI access point detection, fingerprinting, UE-assisted positioning, GPS, timing advance and/or based on LTE-3GPP-positioning, such as Positioning Reference Signals (PRS) introduced in 3GPP TS 23.401 v. 12.1.0. PRS is a method to improve the signal strength and the timing advance measurements performed by the UE 130 by improving the measurement range and number of TPs 120 detectable by the UE 130.

In a first embodiment the information received by the network node 110 may be the actual position of the UE 130. This may be the case when the UE 130 has performed the positioning, e.g. via GPS.

In a further embodiment the positioning may be performed by the network node 110, based on the received information such as cell identity, direction of arrival, signal strength, WiFi access point detection and/or PRS measurements.

In yet another embodiment the received information may be any combination of the above mentioned information types. The positioning may be performed using several positioning methods and/or types of information related to the position of the UE. This method is also referred to as hybrid positioning.

Action 202

When the network node 110 has received the information from each respective UE 130, it identifies any occurrences of hot spots 140 based on the received information. The hot spot 140 is an area where the load density of UEs 130 is above a first threshold. The load density of the UEs 130 may be the number of UEs 130 in a given area resulting in congestion of radio resources, a severe degradation of the Quality of Service or creating strain on the processing power of the TPs 120. The load density of connected or active scheduled UEs may be expressed as #UE/km$^2$. In another embodiment the load density may be described as the data traffic load generated for each UE and may then be expressed as Mbps/m$^2$. In a further embodiment, the load may be expressed in terms of number of UEs physically present in a cell including UEs also in idle state, regardless of whether the UE 130 is scheduled for transmission or not.

Action 203

After having identified one or more hot spots 140, the network node 110 selects a plurality of TPs 121, out of the first set of TPs 120, dedicated to serve UEs 130 located in the hot spot. The UEs 130 located in the hot spot 140 are a subset of the plurality of first UEs 130 served by the network node 110.

In a further embodiment the UEs 130 located in the hot spot 140 may be comprised in a group of UEs 131 to be served by the dedicated TPs 121. The group to be served by the dedicated TPs 121 may further comprise UEs 130 located outside the hot spot. This may be the case when UEs 130 are positioned at the border of a cell neighbouring the hot spot, in this case the TPs 121 serving the hot spot 140 may be the TP 121 most suitable for also serving the UEs 130 of the neighbouring cell.

One way to determine the group of TPs 121 dedicated to serve the UEs 130, 131 in the hot spot 140 may be to choose the TPs 120 directly involved in the geographical area of the hot spot 140, i.e. TPs 120 located in or at the boarder of the hot spot 140.

An alternative embodiment may be derived, by also including immediate neighboring TPs 120 located at a distance from the geographical area of the hot spot 140 in the group of TPs 121. Thereby, the coordinated transmission for the user equipments 130, 131 in the hot spot 140 may be performed by employing not just the TPs 120 directly involved in the hot spot 140, but also the immediate neighbouring TPs 120 located outside the hot spot 140. This transmission scheme is hereinafter called extended hybrid. To each hot spot 140, a neighborhood may be associated, whose extension may be arbitrarily chosen or dynamically obtained based on, for example, the current loads inside and outside the hot spot 140. The denser the demography inside the hot spot 140 is, the more TPs may be included to serve it. Another example would be to include more or less neighbor TPs to serve the hot spots 140 based on quality-of-service requirements established for the UEs 130, 131 inside and outside the hot spot 140.

The selection of the plurality of TPs 121 dedicated to serve the UEs 130 in the hot spot 140 or the group of UEs 131 may be based on a channel condition of the respective TP 121. The channel conditions may be one of, for example, type of fading, fading distribution, average channel gain, line-of-sight component, spatial correlation, delay spread, coherence bandwidth and maximum gain.

In a further embodiment the selection of the plurality of TPs 121 is based on an estimated throughput of the respective TP 120. The throughput is the rate of successful message delivery over a communication channel. The throughput may be measured in bits per second (bit/s or bps), but may also be expressed in data packets per second or data packets per time slot. If a TP 120 has a high estimated throughput this TP 120 is selected to serve the UEs 130 in the hot spot 140 or the group of UEs 131, while a TP 120 with low estimated throughput may be deselected from the plurality of TPs 121. This method of selecting the plurality of TPs may be referred to as Best Rate Allocation (BRA).

In a further embodiment of the method, the selection of the plurality of TPs 121 may be based on the TPs 120 position in relation to the hot spot. Initially only TPs 120 located inside the hot spot 140 may be selected to be comprised in the plurality of TPs 121 dedicated to serve the UEs 130 in the hot spot 140 or the group of UEs 131. However, if the capacity of these TPs 121 is too low to successfully serve the UEs 130 in the hot spot 140 or the group of UEs 131, TPs 120 located outside the hot spot 140 may also be selected to be comprised in the plurality of TPs 121.

The selection of the plurality of TPs 121 to serve the group of UEs 130 in the hot spot 140 or the group of UEs 131 may also be based on Quality of Service, QoS, requirements for the UEs 130 located inside and outside the hot spot. If the UEs 130, 131 located in the hot spot 140 have higher QoS requirements than the UEs 130 located outside the hot spot, additional TPs 120 may be selected to be comprised in the plurality of TPs 121.

It shall be noted that selecting the plurality of TPs 121 may also be based on one or more of the above mentioned techniques in any given combination. In one embodiment the selection of the TPs 121 may start off by selecting the TPs 120 based on their position in relation to the hot spot; when the first set of TPs 121 have been selected another selection of TPs 120 to be added to the plurality of TPs 121 may be made based on the throughput of the respective TP 120.

By continuously selecting the TPs 120 to be comprised in the plurality of TPs 121 dedicated to serve the UEs 130 in the hot spot 140 or the group of UEs 131, the transmission scheme may easily be adapted to temporal variations of the channels and loads, such as temporary hot spots 140 in the cells.

Action 204

When the network node 110 has selected the plurality of TPs 121 dedicated to serve the UEs 130 located in the hot spot 140 or the group of UEs 131, it establishes a coordinated transmission mode from the plurality of dedicated TPs 121 to the UEs 130 located in the hot spot 140 or to the group of UEs 131. The coordinated transmission mode may be one of joint processing, coordinated scheduling, interference alignment and coordinated beamforming.

In this scope of hybrid transmission, the linear Zero-Forcing (ZF) and Minimum Mean Square Error (MMSE) are envisaged as good candidate schemes for the joint processing, whereas Maximum Gain (MG) and Best Rate Allocation (BRA) are some of the candidates for coordinated scheduling. In the MG, the UE 130 is originally scheduled if it presents the best channel condition at that moment from a certain TP 121; the BRA on the other hand decides which are the most appropriate links to be established based on estimates of the CoMP-cell throughput. The BRA algorithm starts by choosing the TP 121 to UE 130 link with the highest channel gain; then it predicts the CoMP-cell throughput for each available TP 121 to UE 130 link. This prediction considers previously scheduled links, and the new choice is of that link leading to the highest estimated throughput. This procedure is repeated as long as the CoMP-cell throughput is not decreased.

In a further embodiment, interference alignment may be selected as the coordinated transmission mode. Interference alignment coordinates transmission phases to a resulting interference phase orthogonal to the sent signal. This provides a better signal-to-interference ratio, which enhances the quality of the signal sent to/from each UE 130 in areas with a high density of UEs 130.

In yet another embodiment coordinated beamforming might be used as coordinated transmission mode. By controlling the phase and the relative amplitude of the transmitted signal, the overall antenna beam may be shaped in the direction of a target receiver. It is thereby possible to direct the beam towards the hot spot 140, which increases the signal strength in the area hot spot 140.

Action 205

In some embodiments, the network node 110 may further select a group of TPs 122 out of the first set of TPs 120 dedicated to serve the UEs 130 not included in the group of UEs 131.

Action 206

When the network node 110 has selected the plurality of TPs 122 dedicated to serve the UEs 130 not located in the hot spot 140 or included in the group of UEs 131, it may establish a second transmission mode from the plurality of dedicated TPs 122 to the UEs 130 not located in the hot spot 140 or in the group of UEs 131. The second transmission mode may be either a coordinated transmission or an uncoordinated transmission. Since the load outside the hot spot 140 is relatively low, the problem with uncoordinated inter-cluster interference reducing the potential coordination gains is minimized.

Figure 3:
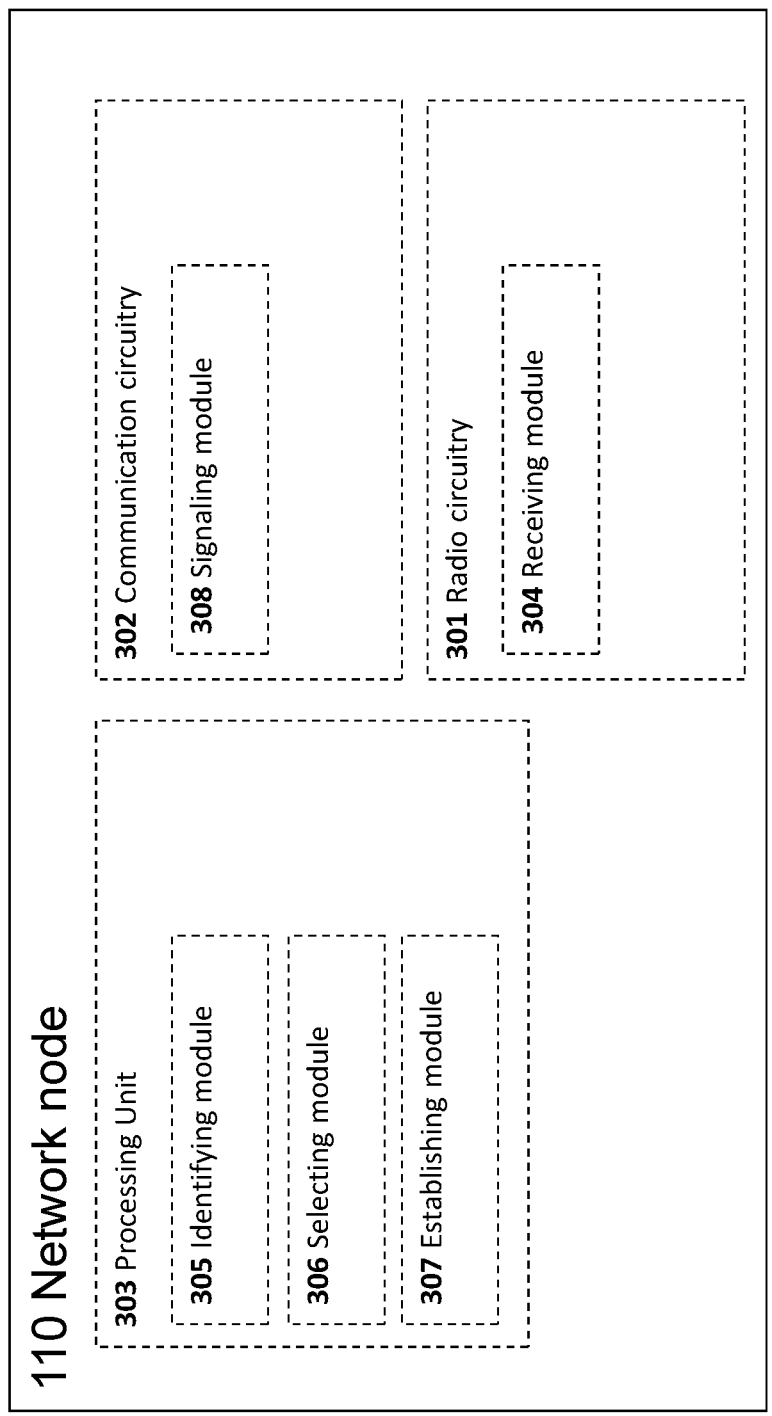
FIG. 3 is a schematic block diagram illustrating embodiments of a network node.

To perform the method actions for handling a transmission between a plurality of TPs 121 and UEs 130 described above in relation to FIG. 2, the network node 110 may comprise the following arrangement depicted in FIG. 3.

The network node 110 comprises a radio circuitry 301 to communicate with served UEs 130, a communication circuitry 302 to communicate with other radio network and core network nodes and a processing unit 303. The radio circuitry 301 used to communicate with served UEs 130 may be one or more TPs 120, comprised in the network node 110.

The network node 110 is configured to, e.g. by means of a receiving module 304 being configured to, receive information from each respective UE 130 out of a number of first UEs 130 served by the network node 110. The received information is related to the location of the UE 130. The receiving module 304 may be comprised in the radio circuitry 301.

The network node 110 is further configured, e.g. by means of an identifying module 305, to identify a hot spot, based on the information received from the UEs 130. The hot spot 140 is an area where the load density of UEs 130 is above a first threshold. The load density of the UEs 130 may be the number of UEs 130 in a given area resulting in congestion of radio resources, a severe degradation of the Quality of Service or creating strain on the processing power of the TPs 120. The load density of connected or active scheduled UEs 130 may be expressed as #UE/km$^2$. In another embodiment the load density may be described as the data traffic load generated for each UE 130 and may then be expressed as Mbps/m$^2$. The identifying module 305 may be comprised in the processing unit 303.

The network node 110 is further configured, e.g. by means of a selecting module 306, to select a plurality of TPs 121 dedicated to serve the UEs 130 located in the hot spot, which UEs 130 located in the hot spot 140 are a subset of the plurality of first UEs 130.

In a further embodiment the network node 110 may be configured, e.g. by means of the selecting module 306, to select a plurality of TPs 121 dedicated to serve a group of UEs 131. The group of UEs 131 to be served by the TPs 121 comprises the UEs 130 located in the hotspot and may further comprise UEs 130 located outside the hot spot. The selecting module 306 may be comprised in the processing unit 303.

The plurality of TPs 121 dedicated to serve the UEs 130 in the hot spot 140 or the group of UEs 131 may comprise TPs 120 located inside the hot spot. In a further embodiment the plurality of TPs 121 dedicated to serve the UEs 130 in the hot spot 140 or the group of UEs 131 may comprise TPs 120 located outside the hot spot.

In a first embodiment the selection of the plurality of TPs 121 may be based on a channel condition of the TP 121.

The selection of the plurality of TPs 121 may also be based on an estimated throughput of the TP 121.

In a further embodiment the selection of the plurality of TPs 121 may be based on the TPs 121 position in relation to the hot spot.

The selection of the plurality of TPs 121 to serve the group of UEs 130 in the hot spot 140 or the group of UEs 131 may also be based on Quality of Service, QoS, requirements for the UEs 130 located inside and outside the hot spot

140. If the UEs 130 located in the hot spot 140 have higher QoS requirements than the UEs 130 located outside the hot spot 140, additional TPs 120 may be selected to be comprised in the plurality of TPs 121.

The network node 110 is further configured to, e.g. by means of an establishing module 307 being configured to, establish a coordinated transmission mode from the plurality of dedicated TPs 121 to the UEs 130 located in the hot spot 140 or the group of UEs 131. The establishing module 307 may be comprised in the processing unit 303.

The network node 110 may further be configured to, e.g. by means of a signaling module 308 being configured to, signal the established coordinated transmission to TPs 121 controlled by other network nodes 110, which TPs 121 are dedicated to serve the UEs 130 in the hot spot 140 or the group of UEs 131. The signaling module 308 may be comprised in the communication circuit 302.

The communication circuitry 302 may be a wireless transceiver, comprised in the network node 110.

In wireless cellular networks, the application of the CoMP technology has been envisaged as an attractive means to boost the experience of the UEs 130.

The CoMP technology allows a dynamic coordination of transmission and reception for multiple geographically separated TPs. By dynamically coordinating the TPs in a wireless network, a TP currently serving a cell with a low load can be redirected to serve a cell or an area with a high load, such as a hot spot 140. CoMP thereby enables a more efficient utilisation of the available TPs 120 in the network.

Figure 4:
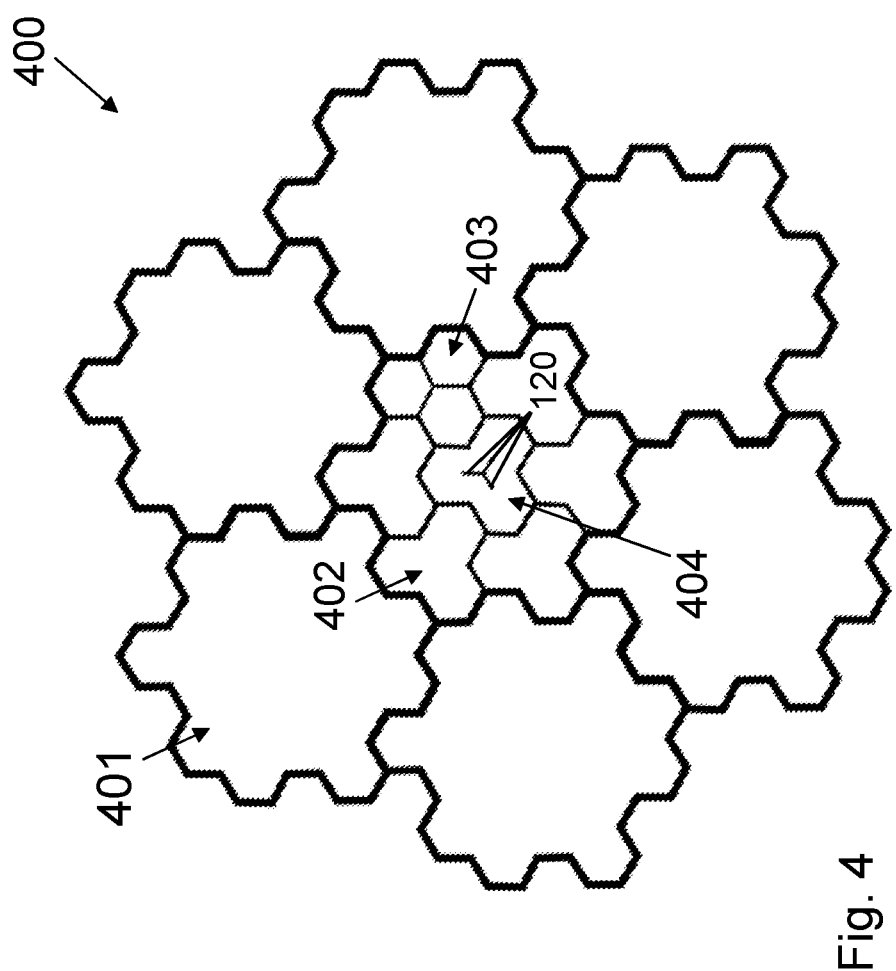
FIG. 4 is a block diagram illustrating a multicell scenario comprising seven CoMP-cells.

FIG. 4 depicts a multicell scenario according to embodiments herein, comprising seven CoMP-cells 401, such a scenario is also known as a supercell 400. The CoMP-cell 401 is the geographical area associated to a CoMP cooperating set with a fast backhaul. A set of seven CoMP-cells 401 composes the system, each of them served by a base station (BS) such as the network node 110. A set of seven sites 402 composes a CoMP-cell 401. In this example each site 402 is three sectored, with each 120° sector 403 served by its own single-antenna TP 120. The TPs 120 are at the corner shared by the three sectors 403, as indicated by site 404 in FIG. 4. Thus, a total of 21 TPs is present in each CoMP-cell 401. The BS in the CoMP-cell 401 continuously receives information related to the location of the UEs 130 in the sectors served by the BS. Based on the received information the BS identifies any occurrence of hot spots 140 inside the CoMP-cell 401. Depending on the size and the load density of the hot spot 140 the BS selects a plurality of TPs 121 inside the CoMP-cell 401 dedicated to serve the UEs 130, 131 located in the hot spot 140. In case the hot spot 140 is located at the boarder of a CoMP-cell 401, TPs 120 located inside a neighbouring CoMP-cell 401 may also be selected to serve the UEs 130, 131 located in the hot spot 140. Different scenarios of hot spots 140 will now be described with reference to FIG. 5.

Figure 5:
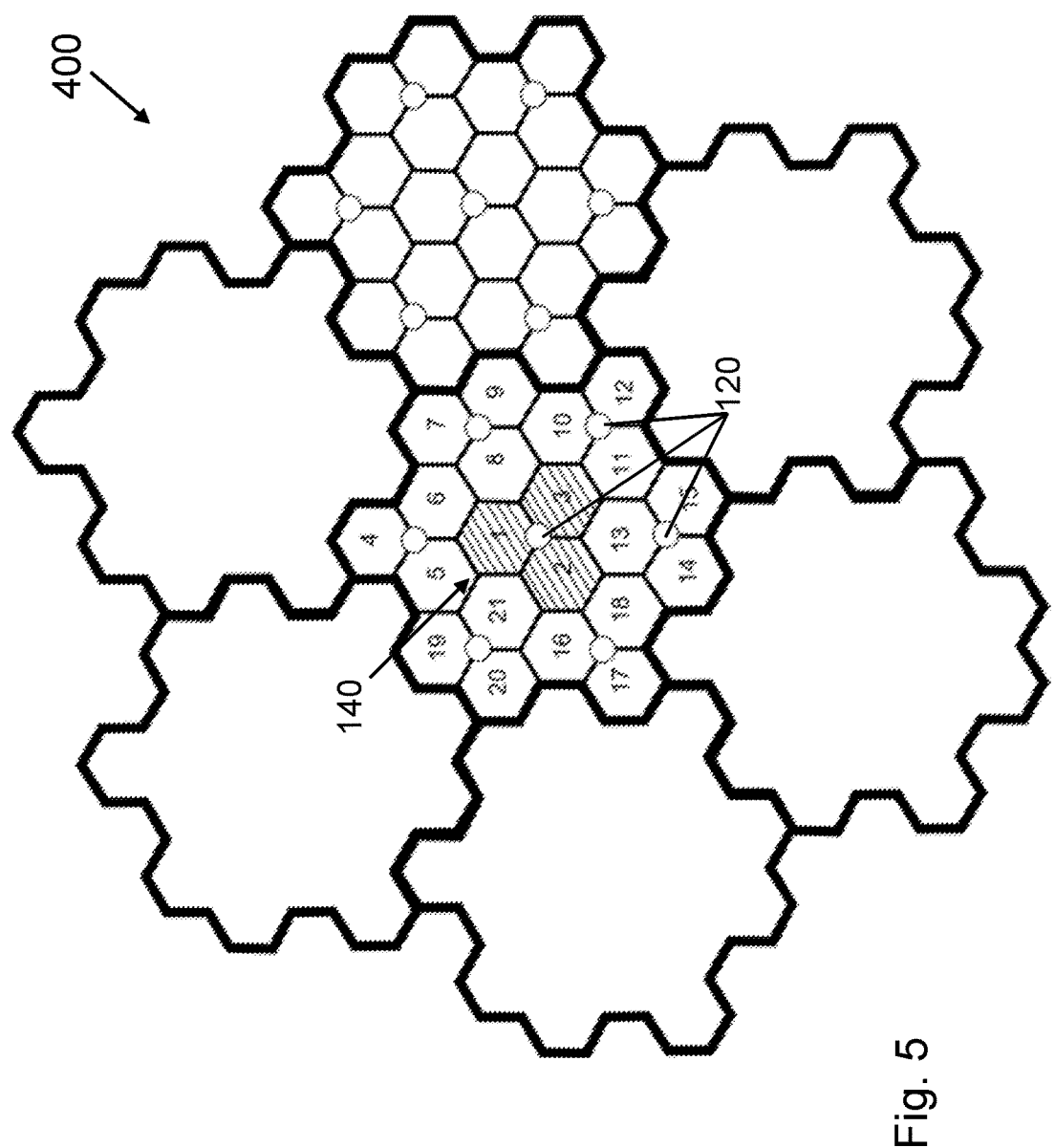
FIG. 5 is a block diagram illustrating a multicell scenario with three cells in a single hot spot.

In a first scenario a single hot spot 140 covers the three central cells 1, 2 and 3 marked with diagonal stripes, of the central CoMP-cell 401, as illustrated in FIG. 5. One way of selecting the group of TPs 121 dedicated to serve the UEs 130, 131 in the hot spots 140 may be just to consider the TPs 120 involved in the geographical area of the hot spot 140. In the scenario depicted in FIG. 5, the TPs 120 involved would be the TPs 120 in the central site 404, which are serving the sectors 1, 2 and 3.

Alternative variants of the hybrid transmission scheme may be derived, by slightly dissociating the sets of TPs 120 under coordination from the hot spots 140 area. As an example, the coordinated transmission for the UEs 130 dedicated to be served by the TPs 121 may be performed by employing not just the TPs 120 directly involved in the hot spot 140, but also the immediate neighboring TPs 120. This transmission scheme is hereinafter called extended hybrid.

To each hot spot 140, a neighborhood may be associated, whose extension may be arbitrarily chosen or dynamically obtained based on, for example, the current loads inside and outside the hot spot 140. The denser the demography of UEs 130, 131 inside the hot spot 140 is the more TPs 120 may be included to serve it.

Another example would be to include more or less neighbor TPs 120 to serve the hot spots 140 based on quality-of-service requirements established for the UEs 130 inside and outside the hot spots 140. Here it is assumed that a single hot spot 140 may be formed for a single cell or multiple adjacent cells. When there are non-adjacent cells bearing the largest subpopulations, multiple hot spots 140 have to be considered. In the embodiment shown in FIG. 5, the extended hybrid scheme may establish the joint processing from the one or more of the TPs 120 servicing the sectors indexed by 5, 6, 8, 10, 11, 13, 16, 18, and/or 21.

Figure 6:
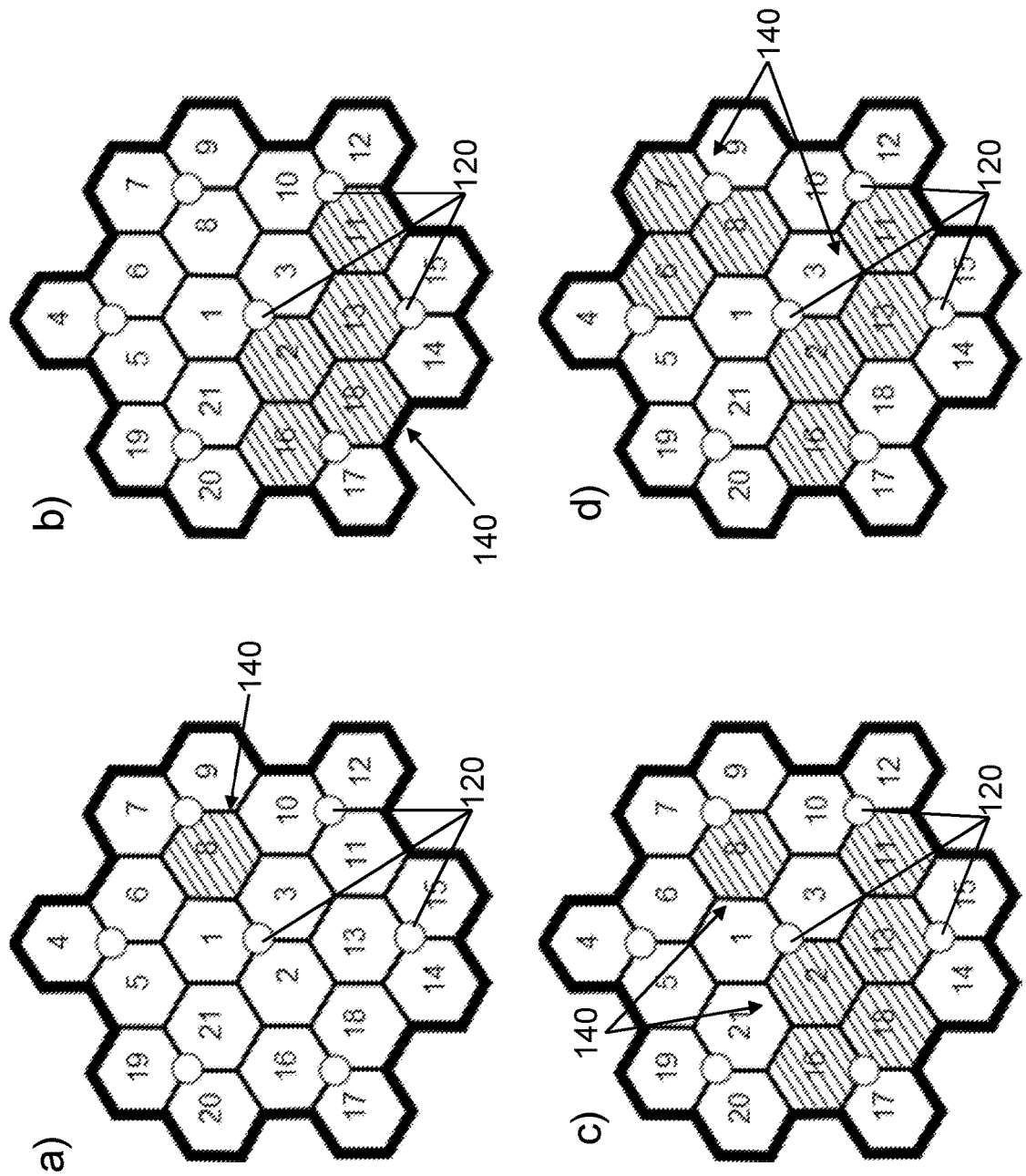
FIG. 6 is a block diagram depicting examples of hot spots with different configurations.

FIG. 6 illustrates several examples of hot spots 140 marked with diagonal stripes, in different numbers and sizes over a set of 21 sectors 403 of a CoMP-cell 401. Since UEs 130 are non-stationary, hot spots 140 may occur in many alternative combinations within one CoMP-cell 401. The hybrid transmission scheme is preferably able to deal with different numbers and sizes of hot spots 140. The areas of hot spots 140 may be identified based on estimates of the load offered for each sector. Such estimates are combined towards a suitable geographical distribution of the load. In this way, perchance discrepancies on such a load distribution may be detected by means of a relative comparison, thereby enabling the delimitation of the areas of the hot spots 140. Examples of hot spots 140 with different configurations are depicted in FIG. 6*a-d*. FIG. 6*a* shows a single hot spot 140 composed of just one sector 8. FIG. 6*b* shows a single hot spot 140 composed of the five sectors 2, 11, 13, 16 and 18. There may however also be several hot spots 140 in each CoMP-cell 401. A first example of this is shown in FIG. 6*c*, which comprises two hot spots 140 whose sizes are one and five sectors. A second example is shown in FIG. 6*d*, which comprises two hot spots 140 whose sizes are three and four sectors.

In a first embodiment every UE 130 may be equipped with a Global Positioning System (GPS) device, which informs its actual location to the Central Processing Unit (CPU), in order to estimate the load per cell. The proximity of UEs 130 to TPs may be obtained not necessarily based on the knowledge of the exact positions of those entities, but it may also be inferred based on the identification of the directions of arrival along which several UEs 130, are found or derived from Received Signal Strength (RSS), Signal to Noise Ratio (SNR) measures and so on, therefrom the intrinsic dependence to channel variabilities along the frequency domain will deserve special attention.

The method described herein may work over the entire downlink bandwidth or part thereof as small as a Resource Block (RB), tightly related to the scope of RSS, SNR measures among others. For example, if an RSS estimate is available for each RB of a 3GPP system, the algorithm may be applied on an RB-by-RB basis; if the RSS estimates are restricted to wideband measures, the algorithm will be applied as for a single resource. Therefore, any interference or dependence among different resources may be neglected.

It is obvious that the hybrid transmission scheme must be able to handle many alternative possibilities of unbalanced load. Therefore, a transmission scheme is defined for each independent hot spot 140. In a further embodiment a second transmission scheme may be defined for the UEs 130 outside the hot spots 140.

The embodiments herein for handling a transmission between a plurality of TPs 120 and UEs 130 in areas with high density of UEs 130, may be implemented through one or more processors, such as the processing unit 303 in the network node 110 depicted in FIG. 3, together with computer program code for performing the functions and actions of the embodiments herein. The program code mentioned above may also be provided as a computer program product, for instance in the form of a data carrier carrying computer program code for performing the embodiments herein when being loaded into the network node 110. One such carrier may be in the form of a CD ROM disc. It is however feasible with other data carriers such as a memory stick, a hard disk, a magnetic storage medium, a portable computer diskette or disc, flash memory, random access memory (RAM) or the like. Furthermore, the term "data carrier" may refer to an internal register memory of a processor or the like. The computer program code may furthermore be provided as pure program code on a server and downloaded to the network node 110.

As used herein, the term "processing unit" may in some examples refer to a processing circuit, a processor, an Application Specific integrated Circuit (ASIC), a Field-Programmable Gate Array (FPGA) or the like. As an example, a processor, an ASIC, an FPGA or the like may comprise one or more processor kernels. In these examples, the processing unit is thus embodied by a hardware module. As used herein, the expression "configured to" may mean that a processing circuit is configured to, or adapted to, by means of software configuration and/or hardware configuration, perform one or more of the actions described herein.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appending claims.

The invention claimed is:

1. A method in a network node for handling a transmission between a plurality of Transmission Points, TPs, and User Equipments, UEs, in a wireless network, the method comprising:
receiving information from each respective UE out of a number of first UEs served by the network node, which information is related to the location of the UE;
identifying a hot spot, based on the information received from the UEs, which hot spot is an area where the load density of UEs is above a first threshold;
selecting a plurality of TPs dedicated to serve UEs located in the hot spot, which UEs located in the hot spot are a subset of the plurality of first UEs, wherein the plurality of TPs are selected at least based on an estimated throughput of the respective TP, the estimated throughput obtained by selecting a TP to respective UE link with highest channel gain and predicting a throughput for each available TP to UE link; and
establishing a coordinated transmission mode from the plurality of dedicated TPs to the UEs located in the hot spot.

2. The method according to claim 1, wherein the UEs in the hot spot are comprised in a group of UEs to be served by the dedicated TPs, and wherein the group to be served by the dedicated TPs further comprises UEs located outside the hot spot.

3. The method according to claim 1, wherein selecting the plurality of TPs is based on a channel condition of the respective TP.

4. The method according to claim 1, wherein selecting the plurality of TPs is based on the TPs position in relation to the hot spot.

5. The method according to claim 1, wherein the plurality of TPs dedicated to serve the UEs in the hot spot or the group of UEs comprises TPs located inside the hot spot.

6. The method according to claim 1, wherein the plurality of TPs dedicated to serve the UEs in the hot spot or the group of UEs comprises TPs located outside the hot spot.

7. The method according to claim 1, wherein selecting the plurality of TPs to serve the UEs in the hot spot or the group of UEs is based on Quality of Service, QoS, requirements for the UEs located inside and outside the hot spot.

8. A network node for handling a transmission between a plurality of Transmission Points, TPs, and User Equipments, UEs, in a wireless network, wherein the network node comprises means to:
receive information from each respective UE out of a number of first UEs served by the network node, which information is related to the location of the UE;
identify a hot spot, based on the information received from the UEs, which hot spot is an area where the load density of UEs is above a first threshold;
select a plurality of TPs dedicated to serve the UEs located in the hot spot, which UEs located in the hot spot are a subset of the plurality of first UEs, wherein the plurality of TPs are selected at least based on an estimated throughput of the respective TP, the estimated throughput obtained by selecting a TP to respective UE link with highest channel gain and predicting a throughput for each available TP to UE link; and
establish a coordinated transmission mode from the plurality of dedicated TPs to the UEs located in the hot spot.

9. The network node according to claim 8, wherein the UEs located in the hot spot are comprised in a group of UEs to be served by the dedicated TPs, and wherein the group to be served by the dedicated TPs further comprises UEs located outside the hot spot.

10. The network node according to claim 8, wherein selecting the plurality of TPs is based on a channel condition of the TPs.

11. The network node according to claim 8, wherein selecting the plurality of TPs is based on the TPs position in relation to the hot spot.

12. The network node according to claim 8, wherein the plurality of TPs dedicated to serve the UEs in the hot spot or the group of UEs comprises TPs located inside the hot spot.

13. The network node according to claim 8, wherein the plurality of TPs dedicated to serve the UEs in the hot spot or the group of UEs comprises TPs located outside the hot spot.

14. The network node according to claim 8, wherein selecting the plurality of TPs dedicated to serve the UEs in the hot spot or the group of UEs is based on the Quality of Service, QoS, requirements for the UEs located inside and outside the hot spot.

* * * * *